May 15, 1928. 1,669,618
W. K. LEWIS
METHOD OF PRODUCING CARBON BLACK
Filed Jan. 2, 1925
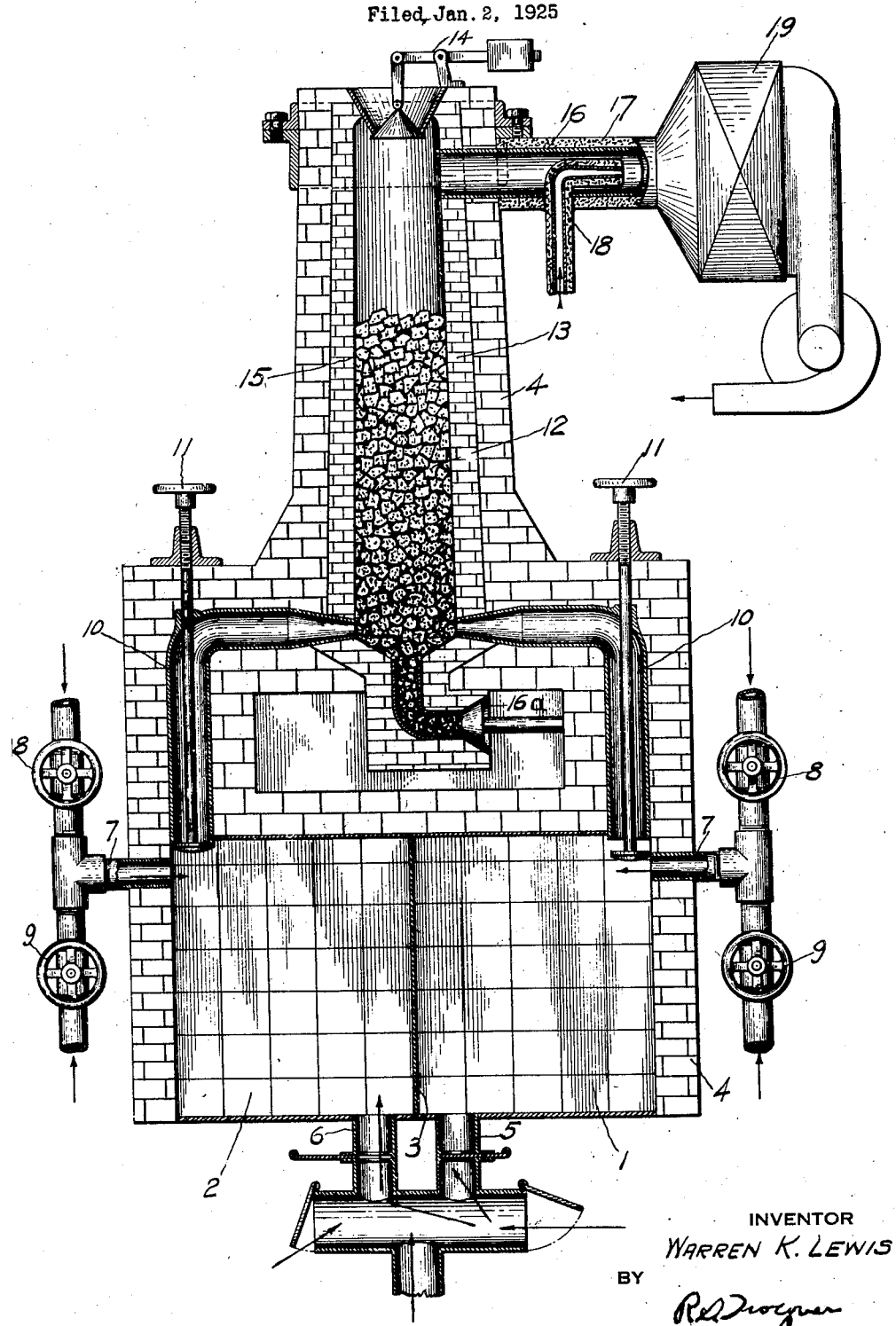
INVENTOR
WARREN K. LEWIS
BY
ATTORNEY Patented May 15, 1928.

1,669,618

UNITED STATES PATENT OFFICE.

WARREN K. LEWIS, OF NEWTON, MASSACHUSETTS, ASSIGNOR TO THE GOODYEAR TIRE & RUBBER COMPANY, OF AKRON, OHIO, A CORPORATION OF OHIO.

METHOD OF PRODUCING CARBON BLACK.

Application filed January 9, 1925. Serial No. 59.

My invention relates to a method of making carbon black and it has, for its primary object, the provision of a method which shall be especially applicable to the production of such material from the various hydrocarbons.

It is well-known that many present-day methods of producing carbon black from hydrocarbons are greatly inefficient, since they result in the production of only a small portion of the carbon black that is obtainable from a specified volume of the hydrocarbon. Consequently, as above designated, one of the objects of my invention is to provide a method which shall be efficient in obtaining a high percentage of carbon black from a given volume of gas, and at the same time insuring a high quality of product.

It is especially true in the rubber industry, where great quantities of carbon black are utilized, that it is necessary to obtain such material in a uniformly finely-divided state. The carbon black is employed as a filler to be compounded with rubber, and unless it is in a very finely-divided state, its value as a filler is greatly reduced, if not destroyed. Furthermore, even if the bulk of the product is sufficiently subdivided, a very small amount of gritty carbon will greatly depreciate its value inasmuch as the larger particles serve as centers for tearing in a vulcanized product.

Another object of my invention, therefore, resides in employing a method of producing carbon black which shall result in a uniformly finely-divided material, which shall be also free of gritty substances.

Methods have been suggested of producing carbon black, all of which employ heat in one form or another to decompose methane into its constituents. One of the principal objections to most of such methods is the fact that the gas to be decomposed is conducted through hot passages, where it comes in contact with hot surfaces, and, as a result, a certain amount of the gas will be catalytically decomposed as a result of a surface combustion phenomenon. It is of common knowledge that hot surfaces not only accelerate, but initiate reactions far below the critical or reactive temperature. Moreover, in this particular case, the carbon that collects on the hot surfaces agglomerates and becomes hard, and therefore a certain amount of the total production of carbon black contains agglomerates which ruin it for application as a compounding agent with rubber.

One of the principal features of my invention is to decompose the gas entirely in the gaseous phase, and to thus prevent the agglomeration of the particles of carbon black after they have been segregated. Another feature of my invention is to maintain the gas to be decomposed in a relatively cool state until it is subjected to heat to decompose it.

According to my invention, a gasified hydrocarbon is introduced into an inert gas, whose temperature is far above that at which the hydrocarbon decomposes. As a matter of convenience, I have found that a mixture of carbon-monoxide and nitrogen serves well. While it is true that at ordinary temperatures, carbon dioxide is an inert gas, at high temperatures it will oxidize free carbon and will itself be reduced to its monoxide. The same oxidizing phenomenon is true of water vapor. It must be realized, of course, that any other inert gas may be employed and although the description of this invention will be limited to this particular mixture, atmospheres of other inert bodies, which possess the proper temperatures, can be substituted therein.

These and other objects will become apparent from the following description of my invention, taken in conjunction with the accompanying drawing in which similar reference numbers indicate corresponding parts, and the invention will be more particularly pointed out in the appended claims.

The single figure of the accompanying drawing is a cross-sectional view of an apparatus that may be utilized in practicing the method of my invention.

In practicing my invention, the principal object to be accomplished is to provide a medium for heating methane or other hydrocarbons to such extent as to decompose it, and produce carbon black. The medium for decomposing methane is preferably inert chemically with respect thereto, so that no objectionable by-products or side chemical reactions occur which may affect the character of the carbon black. In order to produce a sufficiently high temperature to decompose the methane, a standard form of furnace is employed, in which air is preheated and then caused to be intimately associated with a carbonaceous material, such as coke, whereby carbon monoxide and nitrogen are formed, which have a very high temperature. The methane is then introduced into the mixture of gases thus produced, and decomposed in its gaseous phase, after which the products of decomposition are immediately cooled to prevent agglomeration of the carbon particles.

My invention will be more fully understood by reference to the drawing in which is shown a standard form of checker-work regenerator, having a plurality of checker-work chambers 1 and 2 that are separated by a partition 3 of any suitable heat-resisting material. The checker-work construction may be of any suitable material adapted to be heated to a relatively high temperature by a suitable fuel burned in contact therewith.

The chambers are surrounded by heat-resisting materials, forming walls 4 for the entire construction. Separately controlled passages 5 and 6 are provided for the furnaces 1 and 2, whereby they may be heated separately by the introduction of fuel through the passages to heat the chambers alternately, and provide as a whole, a system which may be continuously operated.

Each chamber is also provided with an inlet conduit 7 controlled by a plurality of valves 8 and 9, by means of which air or a mixture of air and gas may be admitted to each chamber where the air is preheated. For example, the chamber 1 may be heated by the admission of fuel through the passage 5 while the passage 6 is closed, and after the checker-work construction of the chamber 1 has been sufficiently heated, the consumption of fuel may be discontinued and air admitted through a passage 10 controlled by a valve 11 to a stack 12, which is lined with carbon blocks 13 or other suitable material.

The stack 12 is provided with an automatic top 14, such as are commonly employed in gas producers whereby coke or other carbonaceous material 15 may be introduced into the stack and with which the heated air contacts to burn it and produce carbon monoxide and nitrogen. The ash from the consumption of the coke may be removed by means of a tap hole 16ª provided at the bottom of the stack. It will be observed that the construction of the heating chambers 1 and 2 are similar and, consequently, a similar passage 10, controlled by a valve 11 communicates with the chamber 2, whereby the alternate use of the chambers is made possible.

Adjacent the top of the stack 12, a conduit 16 is connected thereto to communicate with the interior of the stack, and this conduit is well thermally insulated, as indicated at 17. The hot gases pass from the stack to this conduit 16, into which an ejector nozzle 18 projects. The nozzle 18 is also well thermally insulated, or it is of hollow construction whereby a cooling medium, such as water, may be circulated therein. It is highly desirable that either insulation be employed on this nozzle or that means be provided for cooling it in order that the gas to be decomposed may be introduced into the chamber 16 in a relatively cool state. That is, the vaporized or gaseous hydrocarbon must be maintained, prior to its leaving the nozzle 18, below that temperature, which will cause such decomposition as will give carbon as a product of the reaction. The conduit 16 also communicates with a cooling chamber, indicated at 19, where the products of decomposition are cooled and collected by means of a bag filter or an electrical precipitator.

It will be appreciated from the foregoing description that the apparatus described may be so utilized as to provide a continuous stream of preheated air to contact with the coke and burn it to produce a mixture of nitrogen and carbon monoxide gases, which are both inert with respect to methane or its products of decomposition. The air may be heated in the chambers 1 and 2 to a temperature in the neighborhood of 500° to 1800° C., which temperature may vary widely without disadvantage to the operation of the system. By introducing air at such temperature to contact with and burn the coke, the gases produced from such consumption have a temperature in the neighborhood of 2000° C., which is sufficiently high to decompose methane at a rapid rate.

It will, of course, be appreciated that methane decomposes at various temperatures, depending upon the length of time which it is maintained at any particular temperature. However, at any temperatures below 1000° C., the decomposition of methane is relatively slow, and at temperatures in the neighborhood of 2000° C. its decomposition is rapid. The object of the present invention is to produce inert gases at a temperature which will insure rapid decomposition of the hydrocarbon, and, as above indicated, to introduce the hydrocarbon into such hot gases at a low temperature as compared with that of such gases.

As will now be appreciated, to accomplish this result, it is desirable to provide the alternate heating chambers, which may be maintained at the proper temperature to secure the highly heated air, which is necessary to produce the nitrogen and carbon monoxide gases to the exclusion of carbon dioxide. While I have stated that preheated air is essential, it is to be understood that the only necessity for so treating the air is to increase the capacity of the apparatus and to cut down the fuel consumption.

Where fuel is cheap and high capacity not essential, low preheating is sufficient. On the other hand, where fuel is expensive and large capacity important, high preheating may be employed. Having thus obtained the highly heated inert gases, it is further very desirable to introduce the methane into the stream of highly heated gas in a cool state, and out of contact with any highly heated surfaces. This may be accomplished, as above indicated, by using the nozzle located in the stream of the highly heated gas and introducing the methane thereinto in a cool state, where it is immediately decomposed, and immediately thereafter the products of decomposition collected in a relatively cool chamber.

It will be appreciated that the chamber in which the products of decomposition are collected need be cool only with respect to the temperature at which the products are decomposed. For example, the collecting chamber 19 might reach a temperature of 800° C. without affecting the character of the carbon black, provided that the decomposition of the hydrocarbon has already gone to a point beyond that corresponding to the equilibrium at 800° C.

While I have outlined the temperature limits which may be employed when utilizing methane as a source of carbon, it must be realized that other temperature limits may be chosen when applying this invention to other hydrocarbons. For example, if higher hydrocarbons of the methane series are employed, it will be necessary to maintain undecomposed hydrocarbon at a lower temperature prior to its injection into the hot inert gases. It must also be understood that the process is not limited to methane or even its high homologues, but that other hydrocarbons may be utilized, provided, of course, that they are completely gasified. As an example, any inexpensive aromatic hydrocarbon may be employed; likewise coke-oven gas or any unsaturated gaseous hydrocarbon, such as acetylene and still gases from petroleum refineries, will serve in this capacity.

Although I have shown and specifically described an apparatus that may be employed in practicing my invention, it is obvious that many variations may be made in the type of structure used, without affecting the principles of the method, and I desire, therefore, that no limitations shall be imposed upon the invention, except such as are indicated in the appended claims.

What I claim is:

1. A method of producing carbon black which comprises producing a non-oxidizing diluting gas body having a temperature above the critical temperature of decomposition of a hydrocarbon gas, introducing the hydrocarbon gas in a cool undecomposed state into the body and cooling and separating the products of decomposition.

2. A method of producing carbon black which comprises producing a non-oxidizing diluting gas body having a temperature above the critical temperature of decomposition of methane, introducing methane in a cool undecomposed state into the body and cooling and separating the products of decomposition.

3. A method of producing carbon black which comprises producing a mixture of carbon monoxide and nitrogen gas at a temperature between 1000° C. and 2200° C., introducing a hydrocarbon gas in a relatively cool state into the gas mixture, and cooling and separating the products of decomposition.

4. A method of producing carbon black which comprises producing a mixture of carbon monoxide and nitrogen gas at a temperature between 1000° C. and 2200° C., introducing methane in a relatively cool state into the gas mixture and cooling and separating the products of decomposition.

5. A method of producing carbon black which comprises preheating air, intimately associating such preheated air with a hot carbonaceous material to produce a non-oxidizing gas body having a temperature sufficient to decompose methane, introducing methane in a cool undecomposed state into the gas thereby produced and removing the products of decomposition.

6. A method of producing carbon black which comprises forming a mixture essentially of carbon monoxide and nitrogen gases having a temperature above the decomposition temperature of a hydrocarbon gas by effecting intimate association of preheated air with a carbonaceous material and effecting the decomposition of the hydrocarbon gas by introducing such latter gas in a substantially cool undecomposed state into the mixture of hot inert gases to thereby decompose the hydrocarbon gas while in a gaseous phase, into its elements.

7. A method of producing carbon black which comprises preheating air to a temperature between 500° C. and 1800° C., intimately associating such preheated air with a carbonaceous material to form carbon monoxide having a temperature above the decomposition temperature of methane, introducing methane in an undecomposed state into the gas thereby produced and removing the products of decomposition.

8. A method of producing carbon black which comprises preheating air to a temperature between 500° C. and 1800° C., conducting the heated air through a quantity of coke to form carbon monoxide having a temperature above the decomposition temperature of methane, directing the gas thereby produced through a thermally insulated passage, introducing methane in a relatively cool state into the passage to decompose the methane in the gaseous phase and cooling and separating the products of decomposition.

9. A method of producing carbon black from gaseous hydrocarbons which comprises producing an inert atmosphere of combustion gas substantially free from carbon dioxide and oxygen, and introducing the hydrocarbon gas into the inert gas while the latter is heated to a temperature sufficient to decompose the hydrocarbon to carbon and hydrogen.

In witness whereof, I have hereunto signed my name.

WARREN K. LEWIS.